(12) United States Patent
Nosrati et al.

(10) Patent No.: US 12,080,317 B2
(45) Date of Patent: Sep. 3, 2024

(54) PRE-CONDITIONING AUDIO FOR ECHO CANCELLATION IN MACHINE PERCEPTION

(71) Applicant: DOLBY LABORATORIES LICENSING CORPORATION, San Francisco, CA (US)

(72) Inventors: Hadis Nosrati, Queens Park (AU); Glenn N. Dickins, Como (AU); Nicholas Luke Appleton, Rosebery (AU)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 0 days.

(21) Appl. No.: 17/639,317

(22) PCT Filed: Aug. 27, 2020

(86) PCT No.: PCT/US2020/048291
§ 371 (c)(1),
(2) Date: Feb. 28, 2022

(87) PCT Pub. No.: WO2021/041741
PCT Pub. Date: Mar. 4, 2021

(65) Prior Publication Data
US 2022/0319532 A1 Oct. 6, 2022

(30) Foreign Application Priority Data
Aug. 30, 2019 (EP) ..................................... 19194685

(51) Int. Cl.
*G10L 15/20* (2006.01)
*G10L 21/02* (2013.01)
(Continued)

(52) U.S. Cl.
CPC .......... *G10L 21/0316* (2013.01); *G10L 15/20* (2013.01); *G10L 21/0208* (2013.01); *G10L 2021/02082* (2013.01)

(58) Field of Classification Search
CPC ... G10L 15/20; G10L 21/02; G10L 21/02082; G10L 21/02087; H04B 3/20; H04M 9/082
(Continued)

(56) References Cited

U.S. PATENT DOCUMENTS 4,007,341 A * 2/1977 Sourgens ................. H04B 3/23
708/319
4,064,379 A * 12/1977 Horna ...................... H04B 3/23
379/406.11
(Continued)

FOREIGN PATENT DOCUMENTS

CN 1672341 A 9/2005
CN 107210032 A 9/2017
(Continued)

OTHER PUBLICATIONS

Conne Skidanenko, "Ensuring Voice Quality with Adequate Tail Length", EE Times, Feb. 12, 2002, 7 Pages. (Year: 2002).*
(Continued)

*Primary Examiner* — Martin Lerner (57) ABSTRACT

An apparatus and method of pre-conditioning audio for machine perception. Machine perception differs from human perception, and different processing parameters are used for machine perception applications (e.g., speech to text processing) as compared to those used for human perception applications (e.g., voice communications). These different parameters may result in pre-conditioned audio that is worsened for human perception yet improved for machine perception.

16 Claims, 5 Drawing Sheets

(51) Int. Cl.
*G10L 21/0208* (2013.01)
*G10L 21/0316* (2013.01)

(58) Field of Classification Search
USPC .............. 704/211, 233, 270, 275, 226, 228; 370/286
See application file for complete search history.

(56) References Cited

U.S. PATENT DOCUMENTS

| | | | |
|---|---|---|---|
| 4,074,086 A | 2/1978 | Falconer | |
| 6,563,803 B1* | 5/2003 | Lee | H04M 9/082 370/290 |
| 6,580,696 B1* | 6/2003 | Chen | H04B 3/23 370/290 |
| 6,792,106 B1* | 9/2004 | Liu | H04B 3/234 379/406.01 |
| 7,124,079 B1 | 10/2006 | Johansson | |
| 9,020,144 B1* | 4/2015 | Yang | H04M 9/082 379/406.13 |
| 9,286,883 B1* | 3/2016 | Ayrapetian | G10L 21/0208 |
| 9,558,755 B1 | 1/2017 | Laroche | |
| 9,633,671 B2 | 4/2017 | Giacobello | |
| 9,672,821 B2* | 6/2017 | Krishnaswamy | G10L 15/20 |
| 10,192,567 B1* | 1/2019 | Kamdar | G10L 21/0272 |
| 2003/0235244 A1* | 12/2003 | Pessoa | H04B 3/23 370/290 |
| 2004/0001450 A1* | 1/2004 | He | H04B 3/23 370/290 |
| 2008/0071540 A1 | 3/2008 | Nakano | |
| 2012/0004909 A1 | 1/2012 | Beltman | |
| 2014/0025374 A1* | 1/2014 | Lou | G10L 15/20 704/203 |
| 2014/0112467 A1* | 4/2014 | Wyss | G10L 21/0208 379/406.13 |
| 2015/0078567 A1 | 3/2015 | Mani | |
| 2016/0098989 A1 | 4/2016 | Layton | |
| 2017/0352361 A1 | 12/2017 | Thörn | |
| 2018/0040325 A1 | 2/2018 | Melanson | |
| 2018/0130473 A1 | 5/2018 | Odinak | |
| 2020/0227063 A1* | 7/2020 | Dickins | G10L 21/0208 |

FOREIGN PATENT DOCUMENTS

| | | | | |
|---|---|---|---|---|
| CN | 107680600 B | | 3/2019 | |
| EP | 0060166 A1 | * | 7/1982 | H04B 3/23 |
| EP | 270706 A | * | 6/1988 | H04B 3/238 |
| EP | 746134 A2 | * | 12/1996 | H04M 9/082 |
| EP | 969692 A1 | * | 1/2000 | G10L 15/20 |
| EP | 1202253 A2 | * | 5/2002 | G10L 21/0208 |
| EP | 3002754 B1 | | 6/2018 | |
| EP | 3882914 A1 | * | 9/2021 | G10L 15/20 |
| GB | 2525865 | * | 1/2016 | G10L 21/0208 |
| WO | WO-2018127483 A1 | * | 7/2018 | G01S 3/808 |

OTHER PUBLICATIONS

Freescale Semiconductor, "Digital Network Echo Cancellers", 2004, 2 Pages. (Year: 2004).*
Fan Mingyu; Jin Fan, The application of neural network in echo cancellation in analog full-duplex speech scrambler systems, 1994.
Ko-Chiang Li; S. Hsieh; Jang-Chyuan Jeng, Two-staged nonlinear acoustic echo cancellation and its convergence analysis, 2009.
Martin, A. et al "The DET curve in assessment of detection task performance" In Proceedings of the European Conference on Speech Communication and Technology, 1997, pp. 1895-1898.
Raju, A. et al "Data Augmentation for Robust Keyword Spotting Under Playback Interference" Aug. 1, 2018, Computation and Language; Machine Learning.
Ciochina, S. et al "An optimized NLMS algorithm for acoustic echo cancellation" IEEE International Symposium on Signals, Circuits and Systems, Jul. 9-10, 2015.
Yang, Jun "Multilayer Adaptation Based Complex Echo Cancellation and Voice Enhancement" IEEE International Conference on Acoustics, Speech and Signal Processing, Apr. 15-20, 2018.

* cited by examiner

… instance, the first echo cancellation parameter may correspond to a first echo amount that is less than −60 dB, and the second echo cancellation parameter may correspond to a second echo amount that is between −40 and −20 dB.

According to another embodiment, a non-transitory computer readable medium stores a computer program that, when executed by a processor, controls an apparatus to execute processing including one or more of the methods discussed above.

According to another embodiment, an apparatus processes audio for machine perception. The apparatus includes a processor and a memory. The processor is configured to control the apparatus to receive an audio signal, where the audio signal corresponds to audio that has been captured by a device. The processor is configured to control the apparatus to pre-condition the audio signal according to a machine perception parameter to generate a pre-conditioned audio signal, where the machine perception parameter differs from a human perception parameter. The processor is configured to control the apparatus to perform machine perception, including automatic speech recognition, on the pre-conditioned audio signal to generate a machine perception output.

The apparatus may include similar details to those discussed herein regarding the method. The following detailed description and accompanying drawings provide a further understanding of the nature and advantages of various implementations.

According to yet another aspect, an apparatus for processing audio for machine perception is described. The apparatus may comprise a processor and a memory. The processor may be configured to control the apparatus to receive an audio signal, wherein the audio signal corresponds to audio that has been captured by a device. The processor may be configured to control the apparatus to pre-condition the audio signal by adding noise to the audio signal to generate a pre-conditioned audio signal. The processor may be configured to control the apparatus to perform machine perception, including automatic speech recognition, on the pre-conditioned audio signal to generate a machine perception output.

The added noise may have a characteristic of pink or white noise. A uniformity of a noise field of the pre-conditioned audio signal may be increased compared to a uniformity of a noise field of the audio signal.

According to another aspect, an apparatus for processing audio for human perception and for machine perception is presented. Again, the apparatus may comprise a processor and a memory. The processor may be configured to control the apparatus to receive an audio signal, wherein the audio signal corresponds to audio that has been captured by a device. The processor may be configured to control the apparatus to pre-process the audio signal for human perception by reducing echo residuals to generate a pre-processed audio signal. The processor may be configured to control the apparatus to pre-condition the audio signal for machine perception by reducing echo residuals to generate a pre-conditioned audio signal, wherein an amount of echo residuals of the pre-conditioned audio signal is higher than an amount of echo residuals of the pre-processed audio signal. The processor may be configured to control the apparatus to perform machine perception, including automatic speech recognition, on the pre-conditioned audio signal to generate a machine perception output. The processor may be configured to control the apparatus to pre-process the audio signal for human perception by pre-processing according to a first echo cancellation parameter. The processor may be configured to control the apparatus to pre-condition the audio signal for machine perception by pre-conditioning according to a second echo cancellation parameter. The second echo cancellation parameter may have a smaller convergence than a convergence of the first echo cancellation parameter. The first echo cancellation parameter may have a convergence of between 100 and 200 ms, and the second echo cancellation parameter may have a convergence of less than 50 ms. At this, the first echo cancellation parameter may correspond to a first echo amount that is less than −60 dB, and the second echo cancellation parameter may correspond to a second echo amount that is between −40 and −20 dB.

DETAILED DESCRIPTION

Described herein are techniques for pre-conditioning audio for machine perception. In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having an inclusive meaning. For example, "A and B" may mean at least the following: "both A and B", "at least both A and B". As another example, "A or B" may mean at least the following: "at least A", "at least B", "both A and B", "at least both A and B". As another example, "A and/or B" may mean at least the following: "A and B", "A or B". When an exclusive-or is intended, such will be specifically noted (e.g., "either A or B", "at most one of A and B").

Overview

As will be discussed in more detail below, many existing audio processing systems are tuned to sound pleasant to human listeners (e.g., pre-processing audio prior to transmission, etc.). Examples of such processing parameters for human perception include reducing echo residuals and reducing background noise. In contrast to these processing parameters used for human perception, embodiments discussed herein relate to techniques that improve the performance of machine perception systems (e.g., automatic speech analytics systems based on machine learning algorithms, etc.).

Allowing more echo leakage and background noise is beneficial to the performance of such machine perception systems despite the fact it might sound unpleasant to human listeners. The removal of background noise in a communication system is seen as advantageous for human perception, but removal of background noise may lead to missing syllables in a voice signal misleading the machine learning algorithm in inferring the content and further deteriorating the performance of the automatic speech analytics system.

In general, the techniques described herein provide a multilayer approach, referred to as "pre-conditioning", to improve the processing parameters for automatic speech analytics systems in the presence of echoes and noises. This multilayer processing framework makes the captured signal understandable and predictable for a machine perception system by allowing more echo residuals and background noise, and adding masking noise, as compared to a system designed for human perception.

Human Perception of Audio

Audio processing systems designed for human communication generally include components that take signals from microphones (usually in the presence of noise, which may come from the room or from the actual device containing the microphones) and transform them into clean speech that would be acceptable for another person to listen to. Such audio processing components may be generally referred to as "pre-processing" components. These pre-processing components include technologies such as echo cancellation, echo suppression, noise suppression, noise gating, and automatic gain control (AGC).

Echo cancellation generally operates to remove the output of the device containing the microphones (for example, the device includes a loudspeaker whose output is also detected by the microphone). Echo suppression generally operates to compensate for the echo canceler's inability to completely remove the echo. Noise suppression generally operates on stationary noise or non-stationary noise in the background (e.g., fans, traffic, typing noise, etc.). Noise gating may be used to completely silence the signal when there is no voice happening at all (e.g., as detected by a voice activity detector). AGC generally applies a gain to raise or lower the voice level to a predefined level.

None of these technologies are mathematically fixed; they all have controllable parameters which will be set for the particular use case (which is typically duplex voice communication). How they are configured will be influenced by the preferences of the vendor and/or tuner. However, in general the pre-processing system is tuned such that human perception metrics are improved (or at least, are not negatively impacted to an unacceptable degree). For example, a person experiencing their own echo in a conversation reduces the ability of information to be conveyed. Echo cancelers and suppressors in the pre-processing system will be tuned to never permit any echo for a voice communications system. There are always trade-offs in the tuning process, and this strict no-echo policy could come at the expense of occasionally chopping off the beginnings of words or attenuating parts of the signal when the system has only a low confidence that it contains echo.

As another example, a person in a duplex communication link may become bothered by background noise. Multiple people in a communications call, all of which are transmitting their background noise, further impacts comprehension ability. Noise gating is commonly implemented in the pre-processing system to completely silence audio when it is detected that there is no voice, in order to mitigate the background noise (and also reduce bandwidth requirements over a communications link).

Machine Perception of Audio

Speech recognition systems also benefit from pre-processing to improve their performance. By eliminating many of the non-voice sounds from the signal prior to ASR, we do not need to include excess training data in the ASR to effectively make it an echo-canceler or an AGC for example. We would argue that the cost of a learning network that performed these functions and the cost of collecting the amount of training data to tune the network dramatically outweighs the cost of having pre-processing—switching off pre-processing is not an option. We propose that a system which has been designed to benefit person-to-person communications is likely to have been inadvertently tuned to decrease the performance of a person-to-machine system.

Given the term "pre-processing" is ubiquitously associated to duplex person-to-person communications, we will use the term "pre-conditioning" to refer to a system which has been designed for use as the frontend of a speech detection or speech recognition system. Example technologies in a pre-conditioning system may include noise injection, relaxed echo cancellation, and relaxed echo suppression.

Noise injection generally adds noise when the signal drops below a particular level (either wideband or within individual sub-frequency bands). The added noise adds ambiguity into the ASR. (Such operation may be contrasted with pre-processing for human perception, in which noise is reduced, not added.) In addition, for an ASR, having noise completely disappear represents a situation that likely never occurs in its training set.

Relaxed echo cancellation and suppression are implemented in a pre-conditioning system (as compared to systems that use pre-processing for human perception). For example, an ASR may not care at all about having occasional spurts of echo present in the signal, but may experience problems if the beginnings of words are chopped off. Such operation may be contrasted with pre-processing for human perception, where it is particularly important to ensure that echo is eliminated (e.g., in a duplex person-to-person communication system). For machine perception, the pre-conditioner permits more echo, which enables more real speech to enter the ASR.

Many pre-conditioning system components could be seen as repurposed pre-processing system components with a different tuning strategy to favor the behavior of an ASR. Additionally, a pre-conditioning system may not necessarily contain echo-cancellers—it may exist after a codec purely to enhance corrupted audio before feeding it to the ASR.

In general, "pre-conditioning" refers to signal processing applied prior to an ASR to improve its performance. Pre-conditioning can take input from a wide variety of sources including transmitted audio signals, digitally stored audio signals, a microphone audio signal, recorded signals from analog storage media such as cassette tapes, etc. A pre-conditioning system may also be used as a component of a duplex communications system (e.g., one that also contains a pre-processing system). It may receive one or more of the following signals, such as the near end microphone feed, the near end pre-processed microphone feed (i.e., speech that has been pre-processed for human perception), the far end microphone feed, other sources, etc. As a result, there may be similarity between a pre-conditioning system and a pre-processing system. For example, the local microphone and local speaker output from the system may be both fed in as inputs. Typically, an echo canceller will use these to attempt to remove local talk from the captured signal.

Differences Between Human Perception and Machine Perception of Audio

Although similar processing operations may be used when processing audio for both human perception and machine perception, there may be differences both with the types of processing operations performed and the parameters used in each processing operation. Examples of the differences between human perception and machine perception are as follows.

Human perception is impacted by the cognitive load of the communication, but machine perception may be scaled for difficult communications. For example, a noisy or choppy communications channel is tiring for a human listener, but the processing power of a machine may be increased to overcome this issue. Human perception is influenced by the emotional state of the listener, but machine perception has very little self-awareness. Human perception is easily distracted by stimuli other than the communication, but machine perception is focused on the specific input that is being analyzed. Human perception is "stateful" and uses years of experience to add context to a communication, but machine perception may have a limited state (or even zero state).

Human perception is massively affected by self-echo, but machine perception may easily ignore self-echo. For humans, echoes greater than 50 milliseconds must be attenuated on the order of 60 dB to facilitate normal communication.

Human perception involves coupled speech and listening systems, but machine perception may be implemented using decoupled speech and listening systems. For humans, it is difficult to listen while speaking, but this may be easy for machines.

Human perception generally determines meaning based on a single pass, but machine perception may determine meaning by evaluating the information using multiple passes. For example, a human generally hears a sound and consequently ascribes a meaning, but a machine can store a verbatim copy of the sound and evaluate it multiple times (e.g., using successively more computationally-intensive evaluative processes).

Adjustments for Machine Perception

Given the above-noted differences between human perception and machine perception, a number of adjustments may be made for a system directed toward machine perception (as compared to those used in a system directed toward human perception). As mentioned above, these adjustments may be referred to as "pre-conditioning" (to differentiate from "pre-processing" used in systems directed toward human perception). Three forms of pre-conditioning are further detailed below: Noise suppression, speech inactivity detection and echo scrambling.

Noise Suppression

As mentioned above, human perception is much more negatively impacted by noise than is machine perception. To address this noise issue, pre-processing for human perception includes significant noise reduction. This may result in possibly clipping off the front of speech. (Clipping to reduce noise is an acceptable tradeoff for human perception, since humans will infer information based on the overall situation and context to fill in the clipped sounds.)

A machine, in contrast, does not respond well to silence, as the machine may attempt to infer information when none is present. (Machines are much less able to use the overall situation and context to infer missing information.) To address this issue, the pre-conditioner for machine perception injects a higher level of noise (than the noise level targeted when pre-processing for human perception). Injecting the noise introduces ambiguity to the ASR in the situations where the pre-conditioner is confident that speech is not present. This has the benefit that the system allows the noise suppression component to add more garbage bits of the signal into the audio (as it will be masked by the noise) to increase the change chance that the pre-conditioner will not clip off the front of speech.

In summary, humans need speech to be significantly louder than the background noise. Machines do not require this.

Speech Inactivity Detection

In a pre-processor for human perception, speech inactivity detection is often implemented using a low-latency activity detector that applies a gain to the audio signal. When the activity detector detects speech activity, the gain approaches 1 and the audio signal passes through to the other components of the system (e.g., the transmitter, etc.). When the activity detector does not detect speech activity, the gain quickly drops to 0 to gate out any background noise in the audio signal, prior to the modified audio signal being provided to the other components. As most pre-processing for human perception is implemented in communication systems, low latency is an important consideration so that speech is quickly detected and permitted to pass, and the signal is gated away when speech stops in order to prevent noise trails.

In contrast, in a pre-conditioner for machine perception, low latency is not a typical requirement. The activity detector in the pre-conditioner includes a delay and a holdover component to add some look ahead, ramp-ins, and ramp-outs to reduce glitch signals entering the ASR that may incorrectly be identified as transient-like phonemes (e.g., "ti", "ka", etc.). Because of the extra context in the activity detector, it may be more sensitive (as compared to the human perception case) in order to reduce the likelihood of clipping the front of speech.

Echo Scrambling

A pre-processor for human perception is usually directed toward a duplex communications use case, and includes an echo canceller and an echo suppressor. The echo canceller is tuned to adapt smoothly to the incoming audio signal (e.g., speech), to prevent spurious background noises from changing the behavior of the echo canceller and causing odd artefacts in the audio signal. This smooth adaptation results in a slower adaptation to all echo paths, even the main one that is the object of the cancellation. The echo canceller fails to remove all echo due to system non-linearities; at best, the echo canceller removes about 20 dB of self-echo. For duplex communications, generally 60 dB of self-echo needs to be removed for acceptable performance for human perception, so the pre-processor uses the echo suppressor to remove the excess echo that remains after the echo canceller.

In contrast, in a pre-conditioner for machine perception, echo cancellation may be performed much faster than the smooth adaptation used in pre-processing for human perception. This faster echo cancellation may result in reference coupling and artificial echo bleed, which are acceptable in machine perception, but would be unacceptable in human perception. Furthermore, for machine perception, echo suppression may be performed with heavier smoothing of the suppression gains than those used in pre-processing for human perception. This heavier smoothing of the suppression gains results in the noise spectrum being more white, which is acceptable in machine perception, but would be unacceptable in human perception.

In summary, these modifications to the echo processing in the pre-conditioner for machine perception may be referred to as echo scrambling (instead of echo cancelling or echo suppressing).

Figure 1:
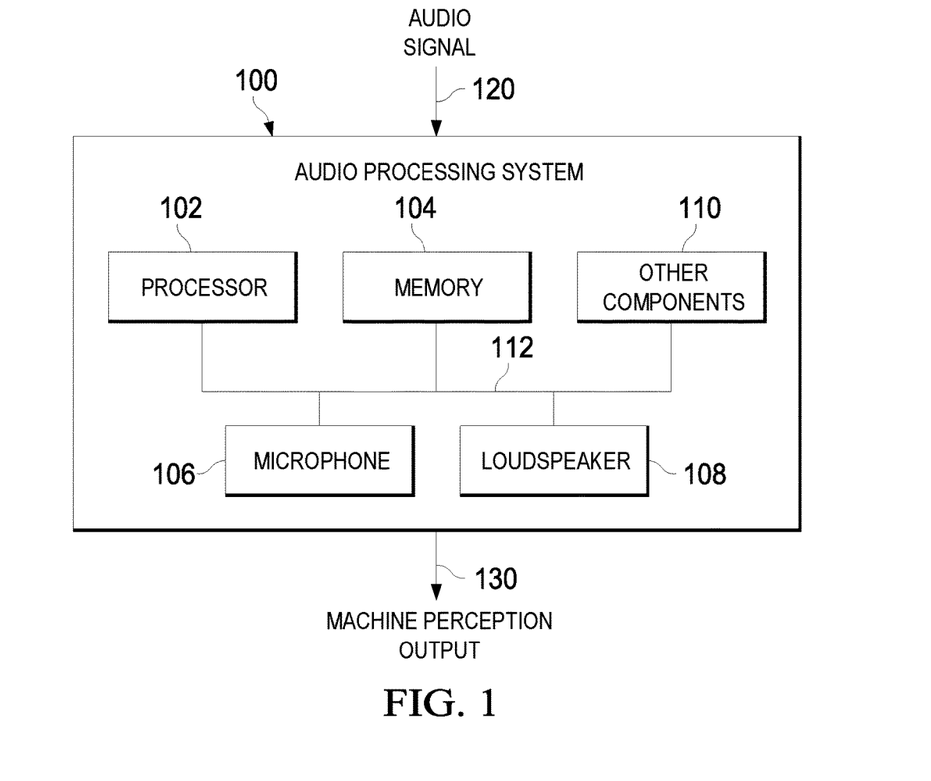
FIG. 1 is a block diagram of an audio processing system 100.

FIG. 1 is a block diagram of an audio processing system 100. The audio processing system 100 includes a processor 102, a memory 104, a microphone 106, a loudspeaker 108, one or more other components 110, and a bus 112. The audio processing system 100 may include other components that (for brevity) are not shown. The audio processing system 100 generally performs pre-conditioning of an audio signal 120, performs machine perception on the pre-conditioned audio signal, and generates a machine perception output 130.

The processor 102 generally controls the operation of the audio processing system 100. The processor 102 may execute one or more computer programs that implement the various signal processing and pre-conditioning functions described herein.

The memory 104 generally stores data that the processor 102 uses as part of operating the audio processing system 100. The memory 104 may store the computer programs that the processor 102 executes and the data that the processor 102 processes. The memory 104 may store data corresponding to the audio signal 120, the pre-conditioned audio signal, the machine perception output 130, and any intermediate data used in processing those signals. The microphone 106 generally receives an audio input. The audio input may correspond to the audio signal 120. Alternatively, the audio signal 120 may be stored by the memory 104 or received by one of the other components 110 (e.g., a receiver component).

The loudspeaker 108 may output an audio output. For example, the memory 104 may store audio data that the loudspeaker 108 outputs, or one of the other components 110 (e.g., a receiver component) may receive audio data that the loudspeaker 108 outputs.

The other components 110 generally provide additional functionality for the audio processing system 100. The other components 110 may include input components (e.g., a wired receiver, a wireless receiver, etc.), output components (e.g., a wired transmitter, a wireless transmitter, etc.), or combined input/output components.

The bus 112 generally connects the components of the audio processing system 100. Although shown as a single bus, the bus 112 may be configured as multiple interconnected buses.

The audio processing system 100 may be implemented in various types of devices. One example device is a smart speaker. A smart speaker is a type of wireless speaker and voice command device with an integrated virtual assistant that offers interactive actions and hands-free activation with the help of one "hot word" (or several "hot words"). Some smart speakers can also act as a smart device that utilizes Wi-Fi, Bluetooth and other wireless protocol standards to extend usage beyond audio playback, such as to control home automation devices. The smart speaker uses machine perception in order to identify the "hot word" or for other ASR purposes. Example smart speakers include the Amazon Echo™ device, the Apple HomePod™ device, and the Google Home™ device.

Another example device is a mobile telephone. The mobile telephone includes the audio processing system 100 to perform pre-conditioning for machine perception, for example when the mobile telephone implements a voice-controlled virtual assistant. Since the mobile telephone also performs duplex communication functions, the audio processing system 100 also performs pre-processing for human perception. The processing parameters that the audio processing system 100 uses for pre-conditioning differ from those used for pre-processing.

Further details of the audio processing system 100 are provided below.

Figure 2:
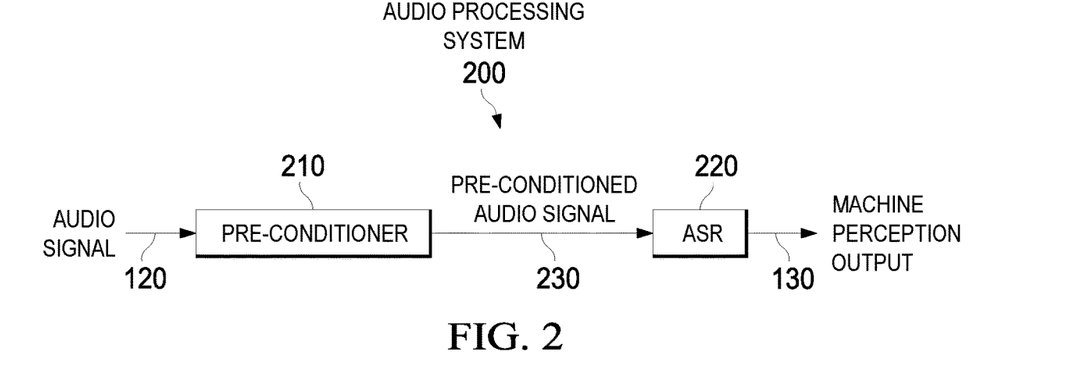
FIG. 2 is a block diagram of an audio processing system 200.

FIG. 2 is a block diagram of an audio processing system 200. The audio processing system 200 may be implemented by the audio processing system 100 (see FIG. 1), for example by the processor 102. The audio processing system 200 includes a pre-conditioner 210 and an ASR component 220.

The pre-conditioner 210 receives the audio signal 120 (see FIG. 1), performs pre-conditioning of the audio signal 120 according to a machine perception parameter, and generates a pre-conditioned audio signal 230. The machine perception parameter differs from a human perception parameter. For example, the machine perception parameter may be noise injection, which differs from the noise reduction used for human perception. As another example, the machine perception parameter may be a delay or a holdover in an activity detector, which differs from the low-latency activity detector used for human perception. As another example, the machine perception parameter may be echo scrambling, which differs from the echo cancellation or echo suppression used for human perception. The ASR component 220 performs machine perception on the pre-conditioned audio signal 230 to generate the machine perception output 130 (see FIG. 1). The machine perception may be automatic speech recognition, wakeword detection, speech to text processing, talker identification, emotion detection, language detection, etc.

The device that implements the audio processing system 200 may then perform an action in response to the machine perception output 130. For example, when the wakeword is detected, the device may perform a wake operation. When speech to text processing is performed, the resulting text may be stored, transmitted or displayed.

Figure 3:
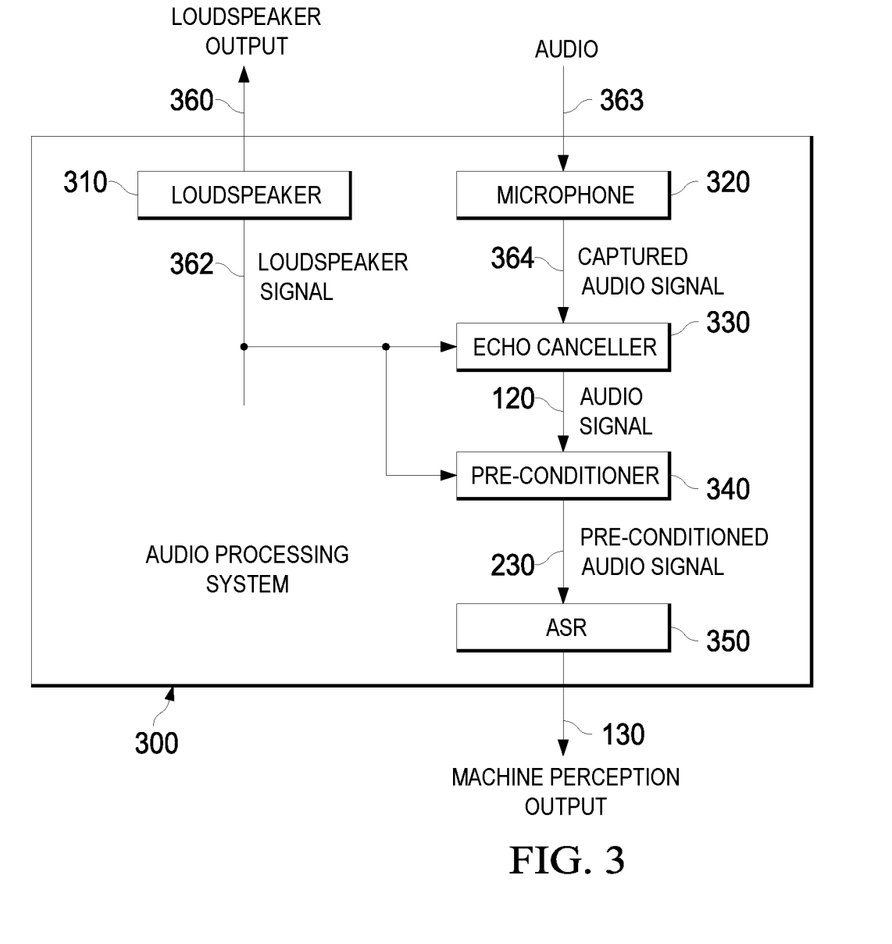
FIG. 3 is a block diagram of an audio processing system 300.

FIG. 3 is a block diagram of an audio processing system 300. The audio processing system 300 may be implemented by the audio processing system 100 (see FIG. 1), for example by the processor 102. The audio processing system 300 may be a component of a smart speaker. The audio processing system 300 includes a loudspeaker 310, a microphone 320, an echo canceller 330, a pre-conditioner 340, and an ASR component 350.

The loudspeaker 310 may be similar to the loudspeaker 108 (see FIG. 1). The loudspeaker 310 outputs a loudspeaker output 360 based on a loudspeaker signal 362. For example, when the audio processing system 300 is implemented in a smart speaker, the loudspeaker output 360 may correspond to a musical selection.

The microphone 320 may be similar to the microphone 106 (see FIG. 1). The microphone 320 captures audio 363 and generates a captured audio signal 364 that includes an echo component and a captured component. The echo component corresponds to the loudspeaker output 360 that has been output by the loudspeaker 310, and the captured component corresponds to an audio source other than the loudspeaker 310. For example, the captured component may result from a person speaking in the same room as the audio processing system 300.

The echo canceller 330 performs echo cancellation, using the loudspeaker signal 362, on the captured audio signal 364 to generate the audio signal 120 (see FIG. 1).

The pre-conditioner 340 may be similar to the pre-conditioner 210 (see FIG. 2), and perform pre-conditioning on the audio signal 120 to generate the pre-conditioned audio signal 230, in a manner similar to that described above regarding the audio processing system 200.

The ASR component 350 may be similar to the ASR component 220 (see FIG. 2), and performs machine perception on the pre-conditioned audio signal 230 (using the loudspeaker signal 362 as a reference signal) to generate the machine perception output 130, in a manner similar to that described above regarding the audio processing system 200.

Figure 4:
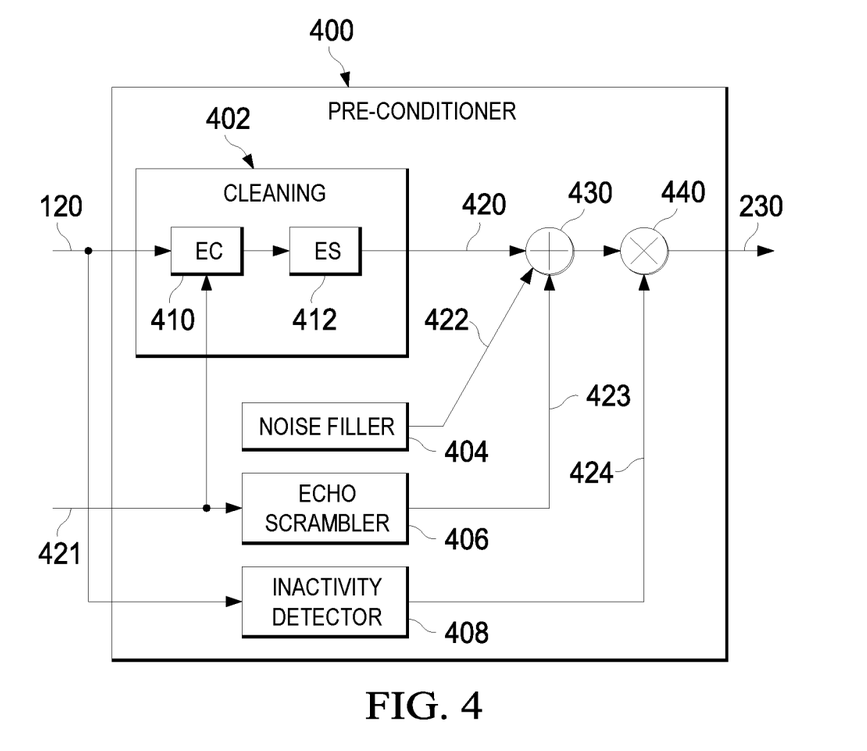
FIG. 4 is a block diagram of a pre-conditioner 400.

FIG. 4 is a block diagram of a pre-conditioner 400. The pre-conditioner 400 may be implemented by the audio processing system 100 (see FIG. 1), for example by the processor 102. The pre-conditioner 400 may be used as the pre-conditioner 210 (see FIG. 2), the pre-conditioner 340 (see FIG. 3), etc. The pre-conditioner 400 includes a cleaning component 402, a noise filler 404, an echo scrambler 406, and an inactivity detector 408.

The cleaning component 402 receives the audio signal 120 (see FIGS. 1-3), performs cleaning on the audio signal 120, and generates a cleaned audio signal 420. The cleaning component 402 generally operates as a weak pre-processor. The cleaning component 402 includes an echo canceller 410 and an echo suppressor 412. The echo canceller 410 performs echo cancellation on the audio signal 120 using a reference signal 421, then the echo suppressor 412 performs echo suppression on the resulting signal from the echo cancellation. The reference signal 421 may correspond to the loudspeaker signal 362 (see FIG. 3), for example.

As compared to a pre-processor for human perception, the cleaning component 402 may have a number of differences. The cleaning component 402 may have no gain control or level adjustment. The echo canceller 410 may perform much faster echo cancellation, such that this may cause reference coupling and artificial echo bleed in the cleaned audio signal 420. The echo suppressor 412 may perform much less echo suppression, such that burst leaks and residual echo after the canceller remain in the cleaned audio signal 420. The cleaning component 402 may perform much less noise suppression than would otherwise be required for a human listener. The cleaning component 402 may perform less regularization. (Regularization is a post-filtering of gain coefficients in a pre-processor that makes algorithms sound more natural, but can cause loss of information at the start and end of speech.) The cleaning component 402 may be omitted from the pre-conditioner 400 in other embodiments.

In discussing the echo cancellation function of the cleaning component 402, additional detail is provided. General design of an echo canceller involves an adaptive predictive system where a time varying filter attempts to predict as much of the signal presented at the microphone based on a reference signal for what is provided to a speaker. In the case of a multi-channel system with more than one output speaker, such systems are known to be degenerate and suffer from local minima in the adaptation as multiple outputs signals from the speakers combine at a single microphone where the signal is to be predicted. Ideally, the filter should reach a stable state that represents the set of transfer functions from the speakers to the microphones, leaving a residual echo that is approximately a similar temporal envelope and attenuated version of the echo presented at the microphone. At any point, the adaption rate can be increased to more aggressively find a good prediction that reduces the energy in the residual signal. However, two problems occur when the tuning is too aggressive, namely the system will track into spatial degeneracies faster which occurs when some of the speaker outputs are correlated, and also the adaptive filter will find spurious temporary correlations between the output signal (reference) and the component of the incoming signal in the microphone that represents the desired speech to be detected. The first mechanism will cause sudden jumps in the echo leak when the spatial steering of the output across the multiple channels occurs. The second mechanism will introduce a coloration of the desired signal which amounts to a mixed in version of some components of the reference.

As is known in the art, tuning of an echo canceller is delicate balance between the speed of the adaptation and the ability to prevent false adaptation to the desired signal (local talk). In general, the time constants for conventional echo cancellation correspond to a convergence (adaptation) time of around 100 ms or greater. Since the detection of local talk may occur in error by a few frames of audio, a frame typically being 5-20 ms, the adaptation is deliberately slowed to avoid divergence of the adaptation when there is local signal. However, in the case of ASR, we can tolerate temporary destabilization of the adaptive filter to a much larger extent. Such divergence or destabilization causes short time frame leaks. These are very problematic for a user, but can be effectively ignored by an appropriately trained ASR. In the case of some embodiments of the echo canceller 410, we suggest that adaption times in the range of 10-50 ms being applicable and more suited to ASR, with an adaptation range of 20 ms being appropriate in one embodiment.

The echo canceller 410 may otherwise be similar to the other echo cancellers discussed herein (e.g., the echo canceller 330 of FIG. 3, etc.).

The noise filler 404 generates noise 422 according to a noise parameter, and the pre-conditioner 400 adds the noise 422 to the cleaned audio signal 420 to generate the pre-conditioned audio signal 230 (see FIGS. 2-3). The noise 422 increases the uniformity of the noise field of the pre-conditioned audio signal 230 as compared to that of the cleaned audio signal 420. The noise 422 may be applied to the cleaned audio signal 420 when the signal drops below a particular level, either over the entire frequency band or within individual sub-bands. The noise 422 adds ambiguity to the pre-conditioned audio signal 230.

The concept of comfort noise is introduced in prior art largely as a means of inserting low level noise fill during times of complete inactivity, when in some cases a transmission system may otherwise be not transmitting or completely silent. A comfort noise system switches between the decoded signal and a generated low-level noise. Typical comfort noise levels are generated and presented at a level that is 20 dB or more lower than the average speech level when viewed as a long term spectrum. Ideal comfort noise is shaped with a similar spectrum to voice or background room noise for which one specification is known as Hoth noise. It represents a noise level in a typical quiet room and in general presentation would be considered detectable but not remarkable to average listeners. In some cases such noise is added continuously, however it is at a level that seem natural for speech conversation. Compared to the long-term average of speech and general noise floor in recordings we see the roughly 20 dB difference in long term spectra, which given the dynamic range and bursty nature of speech represents a signal to noise ratio of speech activity ranging from 20-35 dB. Quite often in noise environments, a noise suppressor is required to push the noise down to achieve this desired target.

In present embodiments we propose a noise level that is only around 10-15 dB below the root mean square (RMS) speech level. To achieve this we will often need an amount of noise addition, a process we call noise fill or masking noise. This masking noise is added continuously without any detection or gating around the presence or detection of speech. The masking noise has the characteristic of pink or spectrally shaped white noise, with the spectrum having a similar shape to the noise profiles for Hoth noise just with 10 dB or more higher level. Such a noise level in listening tests is deemed to be intrusive, artificial and overall a degradation to a human listening experience. However, the addition and obfuscation of other lower level noise that may be in the recording, or artifacts that may have resulted from noise suppression, has a net positive effect on the performance of automated speech recognition.

In one embodiment, the noise fill is a constant addition of random noise signal with spectral shaping as indicated above.

In other embodiments we introduce the concept of a filling approach which adds a spectrally shaped noise such that at any point in time the spectrum output of the system is no lower than this target spectral shape. This process is more effective at obfuscating any background suppressed noise and artifacts by creating a target output level 10-15 dB higher than would be in conventional voice and coding systems with the possibility of conventional comfort noise. In this detail, we see that the noise filler 404 adds or fills up to a noise level that is 20-30 dB higher than what would be considered for a well-conditioned audio for human audition. This aspect of pre-conditioning is unexpected and found to be advantageous for automated speech recognition.

The echo scrambler 406 receives the reference signal 421 and obfuscates the echo in the reference signal 421 according to a suppression gain parameter to generate an obfuscated reference signal 423, and the pre-conditioner 400 adds the obfuscated reference signal 423 to the cleaned audio signal 420 to generate the pre-conditioned audio signal 230. The suppression gain parameter increases a smoothing of the suppression gain and increases a whiteness of the noise spectrum of the obfuscated reference signal 423 (as compared to that of the reference signal 421). The obfuscated reference signal 423 adds echo to the cleaned audio signal 420 that was removed by the cleaning component 402. This process of smoothing gains helps to reduce excessive variation in temporal or spectral response that may result from attempts to separate or completely remove perceived noise. This obfuscation may also be referred to as "regularization" and may be implemented as described in U.S. Pat. No. 10,311,891 or 8,712,076.

Note that the noise filler 404 and the echo scrambler 406 are additive after the cleaning component 402 (e.g., using a signal combiner 430), in that they operate to fill back in signal and energy. However, this added signal is of a stochastic or randomized form. One view for this is that the noise filler 404 and the echo scrambler 406 help to propagate ambiguity by replacing something in the parts that the cleaning component 402 may have stripped out or suppressed in the cleaned audio signal 420. The cleaned audio signal 420 output from the cleaning component 402 may create a sense of false confidence of an absence for the machine perception system. That is to say, if the cleaning component 402 suppresses the signal passing through it may appear downstream that there was a provable absence of anything at the input (e.g., the microphone). However, the pre-processing as generally designed for human perception may be attempting to conceal or hide the problem (residual echo) and therefore removing the possibility of some audio signal being present—in this sense the system has turned ambiguity (is there any signal behind this echo) into certainty (the cleaned audio signal 420 is suppressed and/or silent). The addition of the noise filler 404 and the echo scrambler 406 is a means of adding a background noise that covers over much of the conditions where a pre-processing system may have introduced processing artefacts (such as suppressed segments of audio). This idea of adding noise to properly propagate uncertainty into the down-stream machine perception is a noteworthy feature of the embodiments described herein, and it can be seen to be quite different and contradictory to many existing systems, in that we show through example and suggest embodiments where the pre-conditioning for operations and also ideally in training will add a noise component that (paradoxically) serves to increases the overall performance of the machine perception system. The inactivity detector 408 receives the audio signal 120, performs activity detection on the audio signal 120 according to a delay parameter and a gating parameter, and generates a gain 424 that the pre-conditioner 400 applies to the cleaned audio signal 420 (e.g., using a mixer 440) to generate the pre-conditioned audio signal 230. The delay parameter introduces a delay when pre-conditioning the audio signal 120, and the gating parameter introduces a ramp-in and ramp-out when pre-conditioning the audio signal 120. As compared to an inactivity detector used for human perception, the inactivity detector 408 is more sensitive and applies a more aggressive gating (according to the gating parameter) using more delay and more look-ahead (according to the delay parameter).

Figure 5:
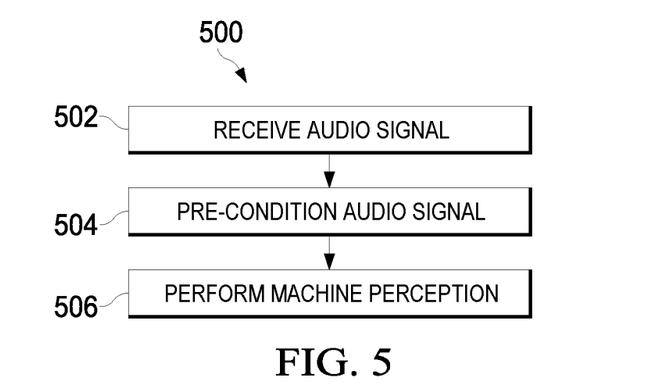
FIG. 5 is a flowchart of a method 500 of pre-conditioning audio for machine perception.

FIG. 5 is a flowchart of a method 500 of processing audio for machine perception. One or more steps of the method 500 may be performed by the audio processing system 100 (see FIG. 1), the audio processing system 200 (see FIG. 2), the audio processing system 300 (see FIG. 3), the pre-conditioner 400 (see FIG. 4), for example as controlled by a processor executing one or more computer programs.

At 502, an audio signal is received. The audio signal corresponds to audio that has been captured by a device. For example, the audio signal may correspond to the audio signal 120 captured by the microphone 106 (see FIG. 1). As another example, the audio signal may correspond to data representing audio that has been stored in the memory 104, or that has been captured by a device other than the audio processing system 100.

At 504, the audio signal is pre-conditioned according to a machine perception parameter to generate a pre-conditioned audio signal. The machine perception parameter differs from a human perception parameter. For example, the pre-conditioner 400 (see FIG. 4) may perform pre-conditioning of the audio signal 120 to generate the pre-conditioned audio signal 230, according to the parameters controlling one or more of the cleaning component 402, the noise filler 404, the echo scrambler 406, and the inactivity detector 408. The parameters used by the pre-conditioner 400 differ from the parameters used for human perception systems, as described above for each of the components.

At 506, machine perception is performed on the pre-conditioned audio signal to generate a machine perception output. For example, the ASR component 220 (see FIG. 2)

may perform a machine perception operation such as automatic speech recognition, wakeword detection, speech to text processing, emotion detection, etc. on the pre-conditioned audio signal 230. Based on the machine perception output, the device implementing the method 500 may perform other relevant actions, such as waking up, outputting text, implementing commands provided via speech, etc.

Figure 6:
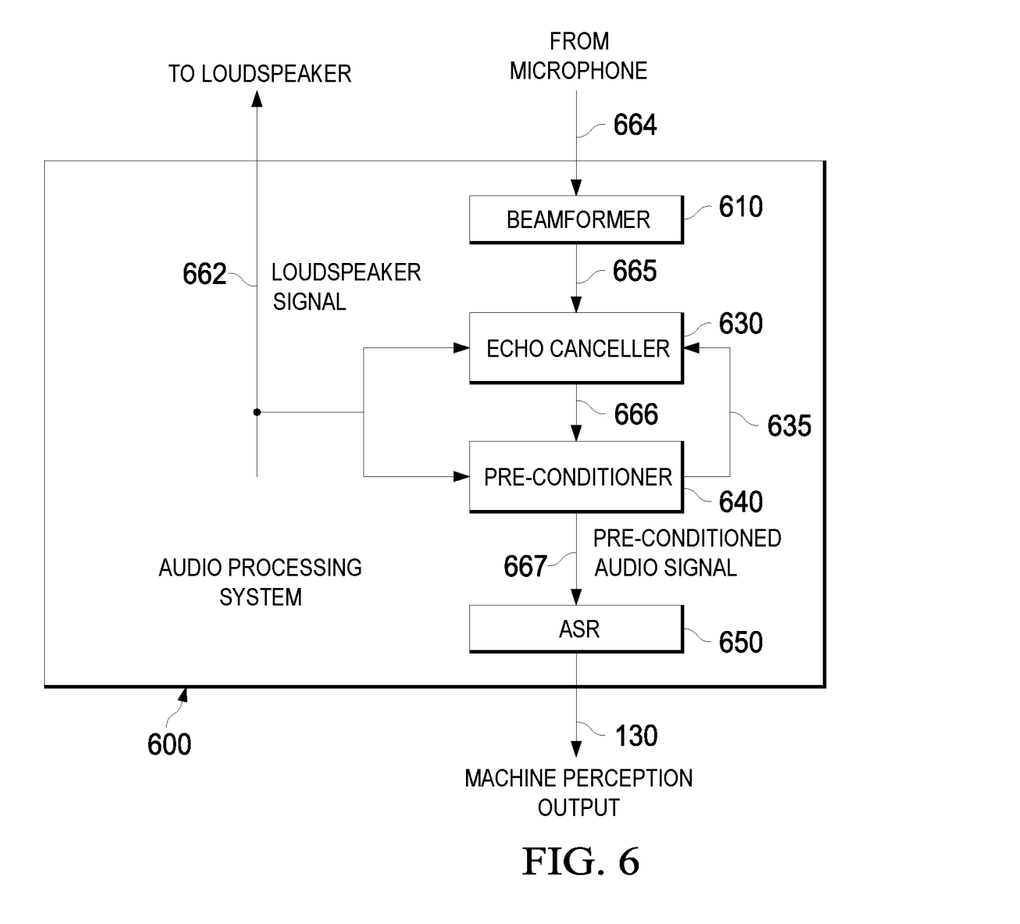
FIG. 6 is a block diagram of an audio processing system 600.

FIG. 6 is a block diagram of an audio processing system 600. The audio processing system 600 may be implemented by the audio processing system 100 (see FIG. 1), for example by the processor 102. The audio processing system 600 is similar to, or may be viewed as an alternative to, the audio processing system 300 (see FIG. 3). The audio processing system 600 receives a captured audio signal 664 from a microphone (e.g., the microphone 106 of FIG. 1) and a loudspeaker signal 662 that is provided to a loudspeaker (e.g., the loudspeaker 108 of FIG. 1). The audio processing system 600 includes a beamformer 610, an echo canceller 630, a pre-conditioner 640, and an ASR component 650.

The beamformer 610 receives the captured audio signal 664, performs beamforming on the captured audio signal 664, and generates a beamformed audio signal 665. In general, the beamformer 610 combines the signals from multiple microphones (not shown) into another spatial signal representation containing fewer channels, so the beamformer 610 may be viewed as an optional (or additional) component. Although the beamformer 610 is described as performing beamforming, the beamformer 610 may include other linear elements that may process the captured audio signal 664 instead of, or in addition to, the beamforming.

The echo canceller 630 receives the beamformed audio signal 665, echo cancellation parameters 635 from the pre-conditioner 640, and the loudspeaker signal 662. The echo canceller generally performs echo cancellation by using the loudspeaker signal 662 to cancel the echo from the loudspeaker and captured by the microphones in the beamformed audio signal 665, according to the echo cancellation parameters 635. The echo cancellation parameters 635 enable the echo cancellation to be adapted according to the results of the pre-conditioner 640. For example, the echo cancellation parameters may adjust echo cancellation parameters over time, such as by freezing or resetting the adaptation. As compared to echo cancellation by pre-processors for human perception, the echo canceller 630 adapts faster (e.g., 20-50 ms adaptation time). Also as compared to echo cancellation by pre-processors for human perception, the echo canceller 630 may have no double talk detector, or its double talk detector may be less sensitive (e.g., only −10 dB). The echo canceller 630 generates an audio signal 666 (cf. the audio signal 120 of FIG. 1). The echo canceller 630 may otherwise be similar to one or more of the other echo cancellers discussed herein (e.g., the echo canceller 330 of FIG. 3, the echo canceller 410 of FIG. 4, etc.).

The pre-conditioner 640 receives the audio signal 666 and the loudspeaker signal 662, performs pre-conditioning on the audio signal 666, and generates a pre-conditioned audio signal 667 (cf. the pre-conditioned audio signal 230 of FIG. 2). The pre-conditioner 640 also generates the echo cancellation parameters 635 based on the results of the pre-conditioning. As compared to a pre-processor (generally targeting human perception), the pre-conditioner 640 is targeted for machine perception, and contains different non-linear and time-varying additive elements. The pre-conditioner 640 may otherwise be similar to one or more of the other pre-conditioners discussed herein (e.g., the pre-conditioner 210 of FIG. 2, the pre-conditioner 340 of FIG. 3, the pre-conditioner 400 of FIG. 4, etc.).

The ASR component 650 performs machine perception on the pre-conditioned audio signal 667 to generate the machine perception output 130, in a manner similar to that described above (e.g., regarding the audio processing system 200 of FIG. 2, the audio processing system 300 of FIG. 3, etc.). The ASR component 650 may otherwise be similar to one or more of the other ASR components discussed herein (e.g., the ASR component 220 of FIG. 2, the ASR component 350 of FIG. 3, etc.).

Figure 7:
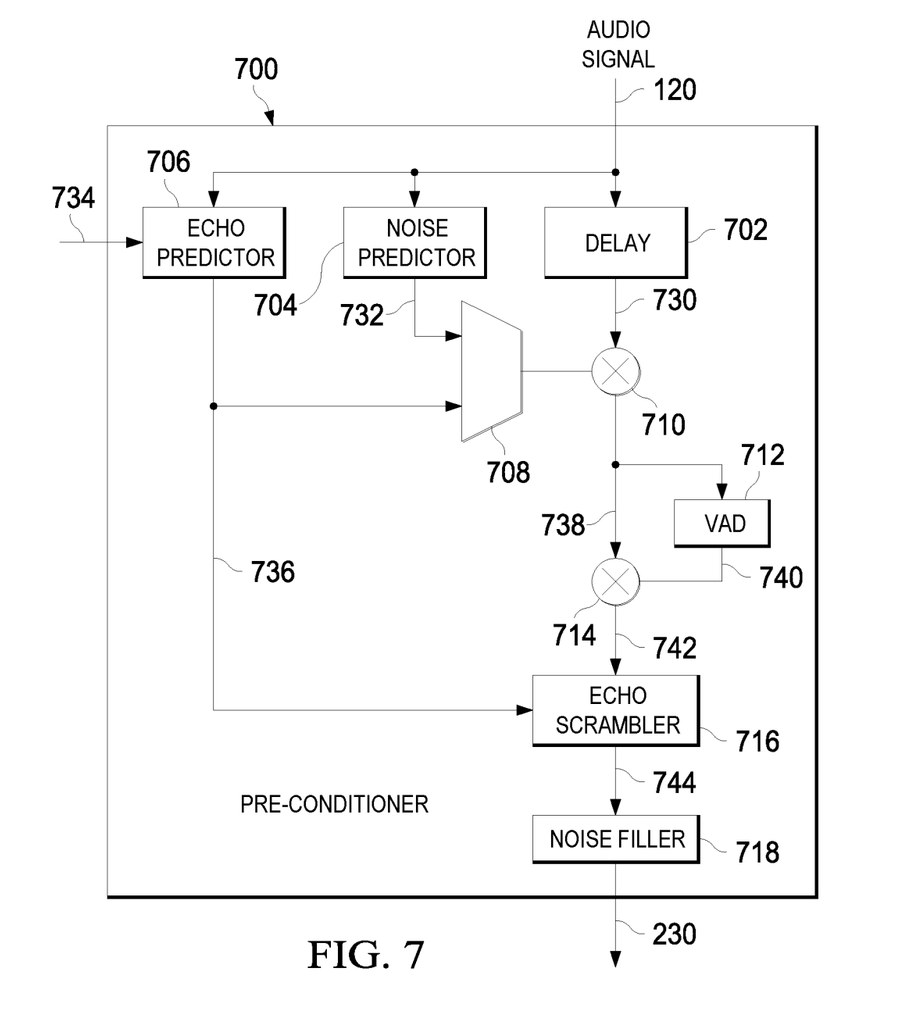
FIG. 7 is a block diagram of a pre-conditioner 700.

FIG. 7 is a block diagram of a pre-conditioner 700. The pre-conditioner 700 may be implemented by the audio processing system 100 (see FIG. 1), for example by the processor 102. The pre-conditioner 700 may be used as the pre-conditioner 210 (see FIG. 2), the pre-conditioner 340 (see FIG. 3), etc. The pre-conditioner 700 may otherwise be similar to the pre-conditioner 400 (see FIG. 4). The pre-conditioner 700 receives the audio signal 120 (see FIGS. 1-3), performs pre-conditioning, and generates the pre-conditioned audio signal 230 (see FIGS. 2-3). The pre-conditioner 700 includes a delay element 702, a noise predictor 704, an echo predictor 706, a combiner 708, a mixer 710, a voice activity detector (VAD) 712, a mixer 714, an echo scrambler 716, and a noise filler 718.

The delay element 702 delays the audio signal 120, resulting in a delayed audio signal 730. The delay element 702 may implement a delay of between 100-200 ms. This delay allows better noise prediction and echo prediction, as the latency in prediction allows for acausal prediction. This delay is generally longer than the delay used in a pre-processor for human perception applications (which is generally less than 100 ms, for example), as longer delays are annoying to humans in many situations, such as for duplex communication applications. The noise predictor 704 performs noise prediction on the audio signal 120 to generate a noise prediction result 732. In general, the noise predictor 704 operates to find the level of the current background noise in the audio signal 120, by looking at a large amount of history to find the minimum levels that were seen spectrally. This gives an indication of a sort of stationary noise floor while ignoring things that come in bursts like speech.

The echo predictor 706 uses a reference signal 734 (e.g., corresponding to the loudspeaker signal, such as 362 in FIG. 3, 662 in FIG. 6, etc.) to perform echo prediction on the audio signal 120, and generates an echo prediction result 736. In general, the echo predictor 706 shares similarities with how the echo canceller (e.g., 330 in FIG. 3, 630 in FIG. 6, etc.) operates but it rather attempts to predict noise power within bands. For example, rather than effectively trying to predict band-limited time-domain signals, the echo predictor 706 is trying to predict energy levels in particular frequency bands given what the device is playing back. The echo predictor 706 operates on the echo cancelled data—so it tries to predict what the echo canceller missed. The echo prediction result 736 represents a prediction of the power level of the echo in the audio signal 120.

The combiner 708 and the mixer 710 work together, using the noise prediction result 732 and the echo prediction result 736, to suppress the noise and to suppress the echo in the delayed audio signal 730. In general, the combiner 708 and the mixer 710 provide a form of limiting or compression of the delayed audio signal 730 in order to slowly move into a noise floor (as the confidence in the signal containing meaningful data approaches zero). As compared to a pre-processor for human perception, the noise suppression is much less, for example approximately 10-15 dB below the RMS voice level (or less than approximately 10-15 dB of signal to noise ratio improvement (SNRI)). (The corresponding noise suppression in a pre-processor for human perception is approximately 20-30 dB below the RMS voice level.) Also compared to a pre-processor for human perception, the echo suppression is much less, for example 5-10 dB below the noise level (or 15-20 dB below the voice level). (The corresponding echo suppression in a pre-processor for human perception is approximately 50-60 dB below the voice level.) As a result of the noise suppression and the echo suppression, the mixer 710 generates a modified audio signal 738.

The voice activity detector (VAD) 712 performs voice activity detection on the modified audio signal 738 to generate a VAD result 740. The VAD 712 implements what may be referred to as soft VAD, having a slower time constant than that in a VAD used in a pre-processor for human perception applications. (For example, the time constant in a VAD for a pre-processor for human perception may be 20-60 ms to ramp up, whereas the time constant for the VAD 712 may be 100-200 ms to ramp up.) The VAD 712 may also involve a delay of 100-200 ms (e.g., to improve detection accuracy), whereas a VAD used in a pre-processor for human perception applications (e.g., duplex communications) generally uses a delay of less than 100 ms. The VAD 712 is not gated at approximately 6 dB, and has an attenuation of between 6-10 dB. Furthermore, the VAD 712 may not fade out as part of the VAD process, since the resulting squelch or sudden end of activity and drop of level due to VAD operation is not perceived as an annoyance by a machine. (In contrast, a VAD used in a pre-processor for human perception applications will generally fade back out over several seconds as part of the VAD process.)

The mixer 714 performs mixing on the modified audio signal 738 using the VAD result 740 to generate a further modified audio signal 742.

The echo scrambler 716 performs echo scrambling on the further modified audio signal 742 using the echo prediction result 736, and generates an echo scrambled audio signal 744. In general, the echo scrambling is additive to the power of the further modified audio signal 742, in a time and frequency varying manner. The target of the echo scrambler 716 depends on the spectra of the echo prediction result 736.

The noise filler 718 performs noise filling on the echo scrambled audio signal 744 to generate the pre-conditioned audio signal 230. In general, the noise filler 718 adds noise to achieve an additive fill to the target power level of the echo scrambled audio signal 744. For example, in a particular frequency band, when the power level is below the noise target level, the noise filler 718 adds noise, and when the power level is above the noise target level, the noise filler 718 does not add noise. In addition, the noise filler 718 operates to fill a fixed spectra, whereas the echo scrambler 716 target depends on the spectra of the echo prediction result 736.

An example implementation for the echo scrambler 716 and the noise filler 718 is as follows. In each frequency band "band" over all frequency bands, over all bins "f" of each frequency band, calculate the signal power P1(f) according to the following equation:

$$P1(f)=P1+sqrt(P2(band)-P3(band)*z*window(band, f))$$

where P1(f) is the signal power in each bin in the band, P1 is the signal power in the band, P2(band) is the target power level of the band (as further defined below), P3(band) is the signal power level of the band, z is a random scalar or complex with unit variance and zero mean, and window (band, f) is a windowing function.

The z function may be any compact random distribution provided it is suitably stationary over time and decorrelated over frequency and time. Example functions include a normally distributed function or a complex number with Rayleigh distributed magnitude, depending on the nature of the transform bins being real or complex. The z function may be implemented using a shift register, a multiply/add/modulo random number generator with uniform distribution and unit power, etc.

The windowing function window(band, f) is a set of coefficients that are used to reduce the raw transform set of frequency bins into a set of frequency bands that are generally spaced on a perceptual scale such as the mel scale, the Bark scale or equivalent rectangular bandwidth (ERB) spacing. Some properties of this weighting are generally a preservation of energy from the bins, in that the sum of window(band,f) across all frequency bins f, is constant and generally unity. Such expressions of a perceptual filterbank mapping from a linear frequency spacing for a large number of bins to a lesser number of bands are known in the art. For example, in one embodiment, the system maps from a set of 320 bins (20 ms frame at 16 kHz) down to 61 bands (the width of each band approximately 10% of the center frequency). P2(band) differs for the echo scrambler 716 and the noise filler 718, respectively referred to as P2echo(band) and P2noise(band). For the echo scrambler 716, P2echo(band) is defined according to the following equation:

$$P2echo(band)=PowerPredictedEcho(band)+ConstantEchoScrambleOffset(band)$$

where PowerPredictedEcho(band) is the power level of the predicted echo in the band, and ConstantEchoScrambleOffset(band) is an offset constant power level for the echo scrambler in the band.

For the noise filler 718, P2noise(band) is defined as follows:

$$P2noise(band)=ConstantNoiseTargetProfile(band)$$

where ConstantNoiseTargetProfile(band) corresponds to a constant noise target profile. Thus, the echo scrambler 716 may be viewed as adding fuzzy noise with a similar envelope to the echo, generally masking it. The offset may be frequency dependent, and generally between 5-15 dB. The noise filler 718 adds fuzzy noise in order to fill the signal up to a given power level and may be performed after the echo scrambler 716 (as shown in FIG. 7). Note that if P2(band) is less than P3(band), nothing is added.

In this way, the pre-conditioner 700 obscures the residual blips and noise in the audio signal 120 with a high and objectionable (from the perspective of human perception) noise level with occasional bursts sticking up, but they are generally short in time and narrow in frequency (e.g., referred to as "barks"), and so are unlikely to register as meaningful phonemes or words by the ASR.

SUMMARY

In summary, although embodiments of the pre-conditioners described herein (e.g., the pre-conditioner 210 of FIG. 2, the pre-conditioner 340 of FIG. 3, the pre-conditioner 400 of FIG. 4, the pre-conditioner 640 of FIG. 6, the pre-conditioner 700 of FIG. 7, etc.) have a resemblance to existing comfort noise generators (CNGs) or pre-processors, there are significant differences due to CNGs being tuned for human perception, whereas the pre-conditioners are tuned for machine perception. A particular embodiment of the pre-conditioners may have one or more of these differences from CNGs. For example, in a CNG the echo cancellation is tuned for 100-200 ms convergence and frequent double-talk detection for voice local down to −20 dB from nominal; whereas in the pre-conditioner, the echo cancellation is tuned down to less than 50 ms convergence and the double-talk detection may be as small as detecting any residual energy within 6-10 dB of the predicted echo. As another example, in a CNG the echo suppression targets sub audible levels (e.g., −60 to −40 dB, or 10-20 dB below the noise level); whereas in the pre-conditioner the echo suppression depends on the amount of echo present, generally suppressing in the range of 0-20 dB such that the residual echo is around the same level as (or slightly lower than) the inserted noise fill used to mask residual artifacts. In this way, the residual echo is only targeted to be below the noise fill, as further suppression than this is unnecessary and would only be for the benefit of a human listener who may get distracted by hearing a delayed voice like signal deep in the noise. As another example, in a CNG the noise suppression targets perceptually low levels (e.g., more than 20 dB below speech level, or more than 10 dB of SNRI); whereas in the pre-conditioner the noise suppression targets between 10-15 dB below speech level, and typically only a small (e.g., less than 10 dB) SNRI, or in some cases no suppression at all. As another example, in a CNG the suppression is applied non-linearly to perform most of the cleaning work, which always lowers the signal energy; whereas in the pre-conditioner the masking noise filler acts in a way where noise is added conditionally based on the energy present in a given band, and generally substantially increases the energy in the passed through signal after some initial removal of noise. This additional noise has the characteristics of very stationary or "electrical hiss" style noise (that would be annoying to listeners in a CNG application). As another example, in a CNG the voice activity detection response has a low latency (e.g., 20-50 ms) when used in communications applications; whereas in the pre-conditioner the voice activity detector has a latency of greater than 100 ms (or as much as 200-500 ms if there is not a need for immediate low latency ASR and response). The system can detect voice and look back at the data to revisit the decision of where the activity commenced—this is generally achieved by running the audio signal through a delay path and calculating the gains and voice activity decision to apply from older audio data. As another example, in a CNG the comfort noise is either switched on/off or is always additive; whereas in the pre-conditioner, the noise filler is continually present throughout the signal (though potentially only added to specific frequency bands when they fall below the target energy of the noise filler).

Implementation Details

An embodiment may be implemented in hardware, executable modules stored on a computer readable medium, or a combination of both (e.g., programmable logic arrays). Unless otherwise specified, the steps executed by embodiments need not inherently be related to any particular computer or other apparatus, although they may be in certain embodiments. In particular, various general-purpose machines may be used with programs written in accordance with the teachings herein, or it may be more convenient to construct more specialized apparatus (e.g., integrated circuits) to perform the required method steps. Thus, embodiments may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein. (Software per se and intangible or transitory signals are excluded to the extent that they are unpatentable subject matter.)

The above description illustrates various embodiments of the present disclosure along with examples of how aspects of the present disclosure may be implemented. The above examples and embodiments should not be deemed to be the only embodiments and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

The invention claimed is:

1. A method of processing audio for machine perception, the method comprising:
receiving an audio signal, wherein the audio signal corresponds to audio that has been captured by a device;
pre-conditioning the audio signal according to a machine perception parameter which includes an echo cancellation parameter having a convergence of between 10 and 20 ms to generate a pre-conditioned audio signal; and
performing machine perception, including automatic speech recognition, on the pre-conditioned audio signal to generate a machine perception output.

2. The method of claim 1, further comprising:
outputting, by a loudspeaker, a loudspeaker output based on a loudspeaker signal;
capturing, by a microphone in proximity to the loudspeaker, a captured audio signal that includes an echo component and a captured component, wherein the echo component corresponds to the loudspeaker output that has been output by the loudspeaker, and wherein the captured component corresponds to an audio source other than the loudspeaker; and
performing echo cancellation, using the loudspeaker signal, on the captured audio signal to generate the audio signal.

3. The method of claim 1, wherein the audio signal includes speech.

4. The method of claim 1, wherein the echo cancellation parameter corresponds to an echo amount that is between −40 and −20 dB.

5. A non-transitory computer readable medium storing a computer program that, when executed by a processor, controls an apparatus to execute processing including the method of claim 1.

6. The method of claim 1, wherein the machine perception parameter includes a noise suppression target of between 10 and 15 dB below a speech level.

7. The method of claim 1, wherein the machine perception parameter includes masking noise that is between 20 and 25 dB greater than a comfort noise.

8. The method of claim 1, wherein the machine perception parameter includes a noise parameter;

wherein pre-conditioning the audio signal comprises adding noise to the audio signal according to the noise parameter to generate the pre-conditioned audio signal; and wherein the noise parameter increases a uniformity of a noise field of the pre-conditioned audio signal as compared to the audio signal.

9. The method of claim 1, wherein the machine perception parameter includes a delay parameter and a gating parameter;

wherein pre-conditioning the audio signal comprises applying a delay according to the delay parameter, and applying a gating according to the gating parameter, to generate the pre-conditioned audio signal; and wherein the delay parameter introduces a delay when pre-conditioning the audio signal, and wherein the gating parameter introduces a ramp-in and a ramp-out when pre-conditioning the audio signal.

10. The method of claim 1, wherein the machine perception output corresponds to at least one of wakeword detection, speech to text output, speech recognition output, talker identification, emotion identification, and language identification.

11. The method of claim 1, wherein pre-conditioning the audio signal comprises:

performing noise prediction on the audio signal to generate a noise prediction result;

performing echo prediction on the audio signal to generate an echo prediction result;

suppressing a noise level in the audio signal according to the noise prediction result and the machine perception parameter; and suppressing an echo in the audio signal according to the echo prediction result and the machine perception parameter.

12. The method of claim 1, wherein pre-conditioning the audio signal comprises:

performing echo prediction on the audio signal to generate an echo prediction result;

performing echo scrambling on the audio signal according to the echo prediction result and the machine perception parameter, to generate an echo scrambled audio signal; and performing noise filling on the echo scrambled audio signal according to the machine perception parameter to generate the pre-conditioned audio signal.

13. The method of claim 1, wherein the echo cancellation parameter has a convergence of 10 ms.

14. The method of claim 1, wherein the echo cancellation parameter has a convergence of 20 ms.

15. An apparatus for processing audio for machine perception, the apparatus comprising:

a processor; and a memory, wherein the processor is configured to control the apparatus to receive an audio signal, wherein the audio signal corresponds to audio that has been captured by a device;

wherein the processor is configured to control the apparatus to pre-condition the audio signal according to a machine perception parameter which is an echo cancellation parameter having a convergence of between 10 and 20 ms to generate a pre-conditioned audio signal; and wherein the processor is configured to control the apparatus to perform machine perception, including automatic speech recognition, on the pre-conditioned audio signal to generate a machine perception output.

16. The apparatus of claim 15, further comprising:

a loudspeaker that is configured to output a loudspeaker output based on a loudspeaker signal; and a microphone, in proximity to the loudspeaker, that is configured to capture a captured audio signal that includes an echo component and a captured component, wherein the echo component corresponds to the loudspeaker output that has been output by the loudspeaker, and wherein the captured component corresponds to an audio source other than the loudspeaker, wherein the processor is configured to control the apparatus to perform echo cancellation, using the loudspeaker signal, on the captured audio signal to generate the audio signal.

* * * * *

UNITED STATES PATENT AND TRADEMARK OFFICE
CERTIFICATE OF CORRECTION

| | | |
|---|---|---|
| PATENT NO. | : 12,080,317 B2 | Page 1 of 1 |
| APPLICATION NO. | : 17/639317 | |
| DATED | : September 3, 2024 | |
| INVENTOR(S) | : Nosrati et al. | |

It is certified that error appears in the above-identified patent and that said Letters Patent is hereby corrected as shown below:

On the Title Page

Column 1, (65) Prior Publication Data, Line 1, After "2022", insert --¶Related U.S. Application Data (60) Provisional of application No. 62/893,972, filed on Aug. 30, 2019.--

Signed and Sealed this
Twenty-sixth Day of August, 2025

Coke Morgan Stewart
*Acting Director of the United States Patent and Trademark Office*